(12) United States Patent
Mehrabi et al.

(10) Patent No.: US 11,405,714 B2
(45) Date of Patent: Aug. 2, 2022

(54) WIRELESS AUDIO DEVICE BATTERY PRE-LOADING AND PRE-CHARGING

(71) Applicant: Bose Corporation, Framingham, MA (US)

(72) Inventors: Taha Mehrabi, Watertown, MA (US); Daniel D. Najemy, Wayland, MA (US); Steve Torku, Uxbridge, MA (US); Suganya Subramanian, Framingham, MA (US)

(73) Assignee: Bose Corporation, Framingham, MA (US)

( * ) Notice: Subject to any disclaimer, the term of this patent is extended or adjusted under 35 U.S.C. 154(b) by 103 days.

(21) Appl. No.: 16/988,105

(22) Filed: Aug. 7, 2020

(65) Prior Publication Data

US 2022/0046352 A1    Feb. 10, 2022

(51) Int. Cl.
  H04R 1/10    (2006.01)
  H02J 50/12   (2016.01)

(52) U.S. Cl.
  CPC .......... H04R 1/1025 (2013.01); H02J 50/12 (2016.02); *H04R 1/1016* (2013.01); *H04R 2420/07* (2013.01)

(58) Field of Classification Search
  CPC .............. H04R 1/1025; H02J 7/00034; H02J 7/007182; H02J 7/045
  See application file for complete search history.

(56) References Cited

U.S. PATENT DOCUMENTS 6,686,723 B1 *  2/2004  Smith .............. H02J 7/00
                                                320/132
8,284,067 B2 * 10/2012  Yasuda ........... H02J 7/0069
                                                340/636.1

(Continued)

OTHER PUBLICATIONS

"ISL9111 and ISL9111A Low Input Voltage, High Efficiency Synchronous Boost Converter with 1A Switch" Datasheet [online]. Renesas Electronics Corporation, Jun. 4, 2012 [retrieved on Jan. 12, 2022]. Retrieved from the Internet: <URL: https://www.renesas.com/us/en/document/dst/isl9111-isl9111a-datasheet>. (Year: 2012).*

(Continued)

*Primary Examiner* — Ryan Robinson
(74) *Attorney, Agent, or Firm* — Bond, Schoeneck & King, PLLC

(57) ABSTRACT

A portable charging case is provided. The case includes a charging interface configured to establish a power transfer connection with a wireless audio device having a battery. The case includes charging circuitry configured to determine a voltage of the battery. The charging circuitry is further configured to, if the voltage is less than or equal to an undervoltage lockout, charge the battery in pre-charging mode. In pre-charging mode, the charging circuitry is configured to apply a constant pre-charging voltage to the battery. The charging circuitry is further configured to switch from pre-charging mode to standard charging mode when the voltage exceeds the undervoltage lockout value. The charging circuit is further configured to determine the voltage by (1) powering on, via a case power source, the (Continued)

wireless audio device; (2) applying, pre-charge load to the device battery; (3) retrieving the voltage; and (4) transmitting the voltage to the case.

20 Claims, 5 Drawing Sheets

(56) References Cited

U.S. PATENT DOCUMENTS

| | | | |
|---|---|---|---|
| 9,502,911 B2* | 11/2016 | Fust | H02J 7/007182 |
| 10,004,911 B2* | 6/2018 | Marnfeldt | H02J 7/0077 |
| 10,044,217 B2* | 8/2018 | Huang | H02J 7/02 |
| 10,075,007 B2* | 9/2018 | Langlinais | G06F 1/263 |
| 10,170,928 B2* | 1/2019 | Dong | H02J 7/34 |
| 10,256,653 B2* | 4/2019 | Yoon | H02J 7/00036 |
| 10,666,067 B2* | 5/2020 | Higgins | H02J 7/007 |
| 11,025,084 B2* | 6/2021 | Ding | H04R 1/1025 |
| 2002/0140399 A1* | 10/2002 | Echarri | H02J 7/0031 320/130 |
| 2003/0088376 A1 | 5/2003 | Zimmerman et al. | |
| 2010/0231172 A1* | 9/2010 | Bastami | H02J 7/04 320/137 |
| 2010/0301803 A1 | 12/2010 | Flemming | |
| 2013/0113415 A1* | 5/2013 | Chen | B65D 19/385 320/107 |
| 2015/0372526 A1* | 12/2015 | Greening | H02J 7/0068 320/134 |
| 2018/0115176 A1* | 4/2018 | Ye | H02J 7/007182 |
| 2018/0276039 A1* | 9/2018 | Boesen | H04M 15/00 |
| 2020/0185949 A1* | 6/2020 | Chang | H02J 7/0047 |
| 2021/0126470 A1* | 4/2021 | Banerjee | H02J 7/00034 |
| 2021/0249886 A1* | 8/2021 | Moon | H02J 7/0045 |
| 2021/0376622 A1* | 12/2021 | Guo | H01M 10/441 |

OTHER PUBLICATIONS

International Search Report and the Written Opinion of the International Searching Authority, International Patent Application No. PCT/US2021/071135, pp. 1-15, dated Dec. 7, 2021.

* cited by examiner

WIRELESS AUDIO DEVICE BATTERY PRE-LOADING AND PRE-CHARGING

BACKGROUND

This disclosure generally relates to systems and methods for loading and charging a re-chargeable battery prior to standard charging procedures.

SUMMARY

This disclosure generally relates to systems and methods for loading and charging a re-chargeable battery prior to standard charging procedures.

In one aspect, a portable charging case may be provided. The portable charging case may include a charging interface. The charging interface may be configured to establish a power transfer connection with a wireless audio device.

According to an example, the wireless audio device may include a device battery. The wireless audio device may further include charging circuitry. The charging circuitry may be configured to determine a device battery voltage of the device battery.

According to an example, the charging circuitry may be further configured to, if the device battery voltage is greater than an undervoltage lockout value, charge the device battery, via the power transfer connection, in standard charging mode. The undervoltage lockout value may be approximately 1.0 V.

According to an example, the charging circuitry may be further configured to, if the device battery voltage is less than or equal to the undervoltage lockout value, charge the device battery, via the power transfer connection, in pre-charging mode. The charging circuit in pre-charging mode may be configured to apply a constant pre-charging voltage to the device battery. The constant pre-charging voltage may be approximately 2.2 V.

According to an example, the charging circuitry may be further configured to switch from pre-charging mode to standard charging mode when the device battery voltage is greater than the undervoltage lockout value. The charging circuit in standard charging mode may be configured to apply a varying standard charging voltage to the device battery to maintain a constant charging current.

According to an example, the charging circuitry may be further configured to switch from pre-charging mode to standard charging mode after charging the device battery in pre-charging mode for a predetermined time interval.

The charging circuit may be further configured to determine the device battery voltage by (1) powering on, via a case power source of the portable charging case, a device microcontroller of the wireless audio device; (2) applying, via the device microcontroller, a pre-charge load to the device battery; (3) retrieving, via the device microcontroller, the device battery voltage; and transmitting (4) the device battery voltage from the device microcontroller to a case microcontroller of the portable charging case. The pre-charge load may include one or more resistors. The case power source may be a case battery.

According to an example, the pre-charging mode may be disabled if the device battery voltage is below a minimum charging voltage. The minimum charging voltage may be 0.5 V.

In another aspect, an audio system may be provided. The audio system may include a first wireless audio device. The first wireless audio device may be an earbud. The first wireless audio device may include a first device battery. The first device battery may be an NiMH battery.

According to an example, the audio system may further include a portable charging case. The portable charging case may include a first charging interface. The first charging interface may be configured to establish a first power transfer connection with the first wireless audio device.

According to an example, the portable charging case may further include charging circuitry. The charging circuitry may be configured to determine a device battery voltage of the first device battery. The charging circuitry may be further configured to, if the first device battery voltage is greater than an undervoltage lockout value, charge the first device battery via the power transfer connection in standard charging mode. The charging circuitry may be further configured to, if the first device battery voltage is less than or equal to the undervoltage lockout value, charge the first device battery via the power transfer connection in pre-charging mode.

According to an example, the audio system may further include a second wireless audio device. The second wireless audio device may include a second device battery. The second wireless audio device may further include a second charging interface configured to establish a second power transfer connection with the second wireless audio device.

According to an example, the charging circuitry may be further configured to determine a second device battery voltage of the second device battery. The charging circuitry may be further configured to, if the second device battery voltage is greater than an undervoltage lockout value, charge the second device battery via the second power transfer connection in standard charging mode. The charging circuitry may be further configured to, if the second device battery voltage is less than or equal to the undervoltage lockout value, charge the second device battery via the second power transfer connection in pre-charging mode.

In another aspect, a method for charging a wireless audio device is provided. The method may include forming, via a charging interface of a portable charging case, a power transfer connection between the wireless audio device and the portable charging case. The method may further include determining, via charging circuitry of the portable charging case, a device battery voltage of a device battery of the wireless audio device. The method may further include, if the device battery voltage is greater than an undervoltage lockout value, charging the device battery, via the power transfer connection, in standard charging mode. The method may further include, if the device battery voltage is less than or equal to the undervoltage lockout value, charging the device battery, via the power transfer connection, in pre-charging mode.

According to an example, determining a device battery voltage of a device battery of the wireless audio device may include the steps of: (1) powering on, via a case power source of the portable charging case, a device microcontroller of the wireless audio device; (2) applying, via the microcontroller of the wireless audio device, a pre-charge load to the device battery; (3) retrieving, via the microcontroller of the wireless audio device, the voltage of the device battery; and (4) transmitting the voltage of the device battery from the device microcontroller to a case microcontroller of the portable charging case.

According to an example, charging the device battery in pre-charging mode may include the step of applying a constant pre-charging voltage to the device battery.

Other features and advantages will be apparent from the description and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various examples.

DETAILED DESCRIPTION

This disclosure generally relates to systems and methods for charging wireless audio devices, such as earbuds. In a typical scenario, a user will initiate charging by inserting an earbud into a portable charging case. Once inserted, the charging case will typically attempt to determine the voltage of the internal battery of the earbud, and, if the device battery voltage is greater than an undervoltage lockout (UVLO) value, the charging case will activate the earbud to commence standard charging mode. However, many new earbuds utilize a class of batteries, such as nickel metal hydride (NiMH) batteries, which may show inconsistent voltages across their terminals after a period of inactivity or as they age. NiMH batteries are safer than other types of batteries, such as lithium-ion, making them preferable for devices inserted into a user's ear. The aforementioned voltage inconsistencies may result in the charging case activating the earbud due to an inaccurately high voltage measurement, only to immediately deplete the stored power of the earbud battery. This power depletion results in the voltage of the earbud battery dropping below the UVLO value, preventing the earbud from charging. The term UVLO is associated with both the minimum battery voltage required to keep the wireless audio device powered on, as well as the startup voltage required to turn on the wireless audio device. This disclosure advantageously addresses this scenario by (1) pre-loading the earbud battery with a resistive load to more accurately determine its voltage and then (2) pre-charging the earbud battery using a constant, high voltage if its battery voltage is less than the UVLO value.

Figure 1:
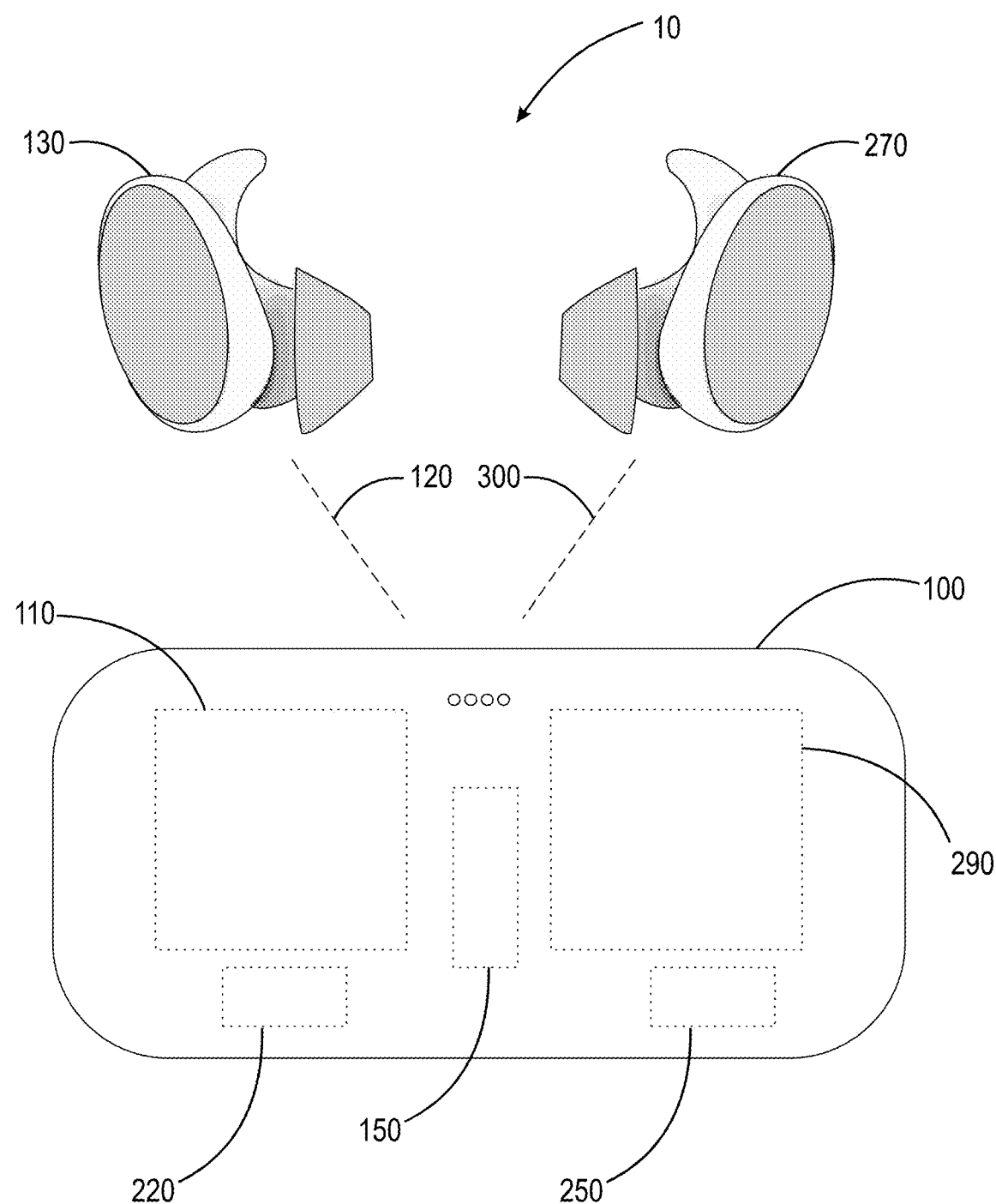
FIG. 1 is a schematic of an audio system, according to an example.
Figure 2:
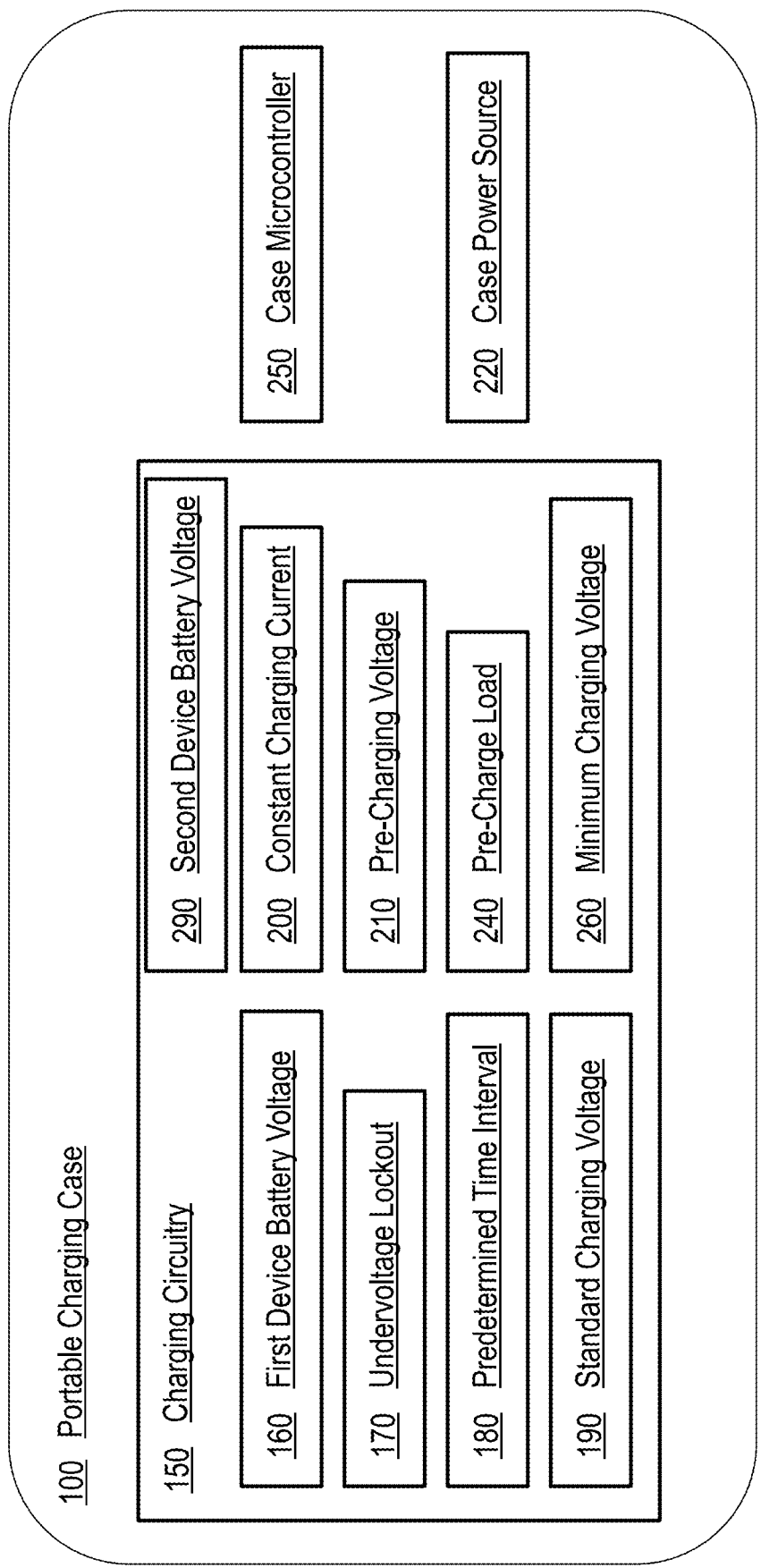
FIG. 2 is a schematic of a portable charging case, according to an example.

In one aspect, and with reference to FIGS. 1 and 2, a portable charging case 100 may be provided. The portable charging case 100 may include a first charging interface 110, a second charging interface 290, charging circuitry 150, a case power source 220, and a case microcontroller 250. The portable charging case 100 may be generally configured to receive and charge one or more wireless audio devices 130, 270, such as earbuds. The portable charging case 100 may be of a size and weight such that a user may carry it with relative ease.

The charging interface 110 may be configured to establish a power transfer connection 120 with a wireless audio device 130. In one example, the power transfer connection 120 may be formed through contact between a portion of the wireless audio device 130 and the charging interface 110. In a further example, the power transfer connection 120 may be formed through contactless inductive charging. The power provided to the wireless audio device 130 via the power transfer connection 120 may be controlled by the charging circuitry 150, described in more detail below.

Figure 3:
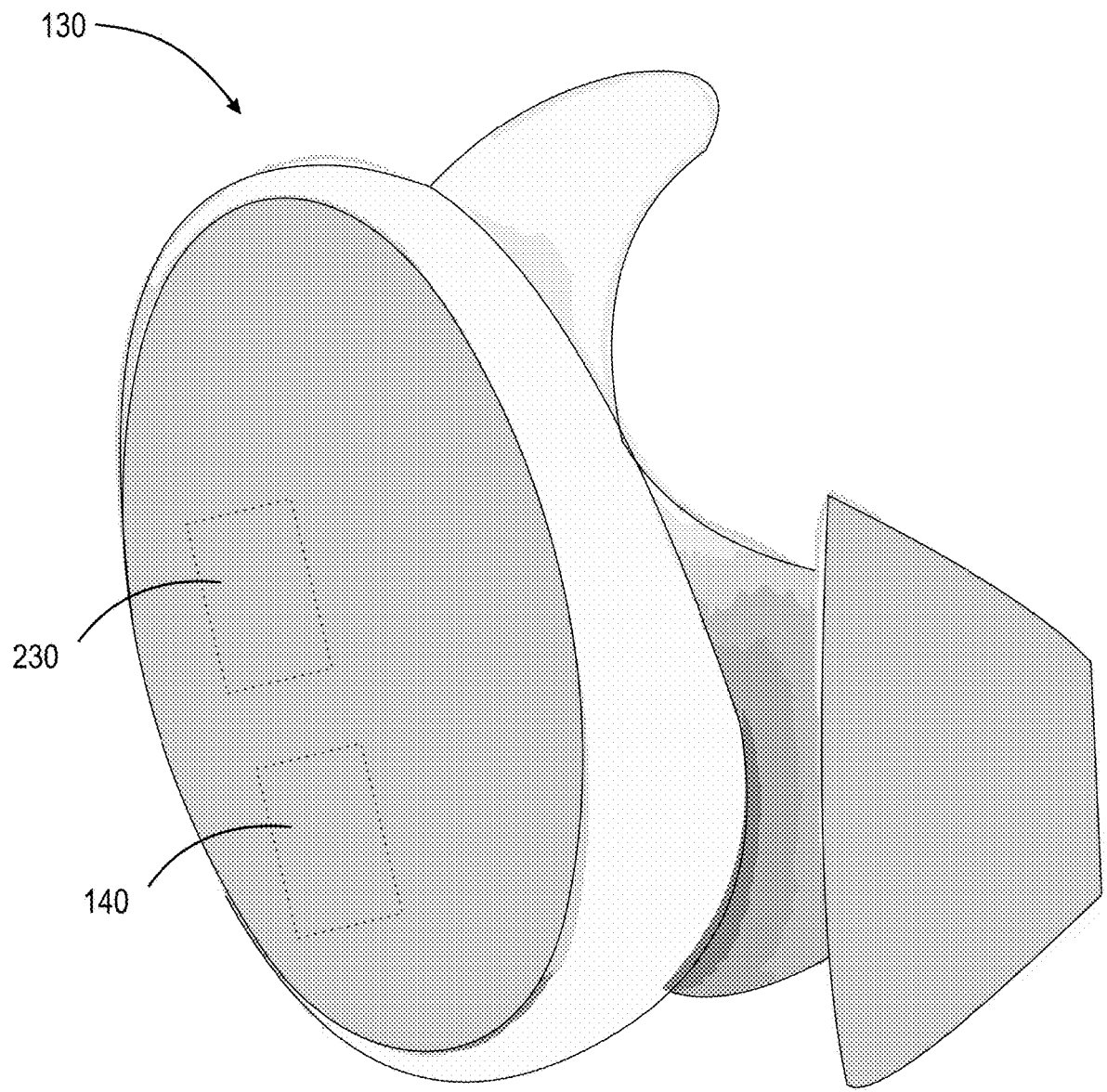
FIG. 3 is an isometric view of a first wireless audio device, according to an example.

According to an example, and with reference to FIG. 3, the wireless audio device 130 may include a device battery 140. The device battery 140 may be an NiMH battery. As described above, NiMH batteries are safer than other types of batteries, such as lithium-ion, making them preferable for devices inserted into a user's ear. However, old NiMH batteries often show inconsistent voltages across their terminals after a period of inactivity. These inconsistent voltages are not a true representation of the amount of charge actually stored inside the battery.

The charging circuitry 150 may be configured to address the inconsistency of voltage shown on NiMH batteries by (1) pre-loading the device battery 140 to more accurately determine the voltage across the terminals of the first device battery 140 and, if necessary, subsequently (2) pre-charging the device battery 140 to a level suitable for standard charging. Pre-charging may be necessary to increase device battery voltage 160 above a UVLO level 170. The UVLO level 170 may be set to prevent malfunctions or damage to either the portable charging case 100 or the wireless audio device 130 during standard charging mode due to an abnormally high amount of current required to charge a device battery 140 with an abnormally low device battery voltage 160. In one example, the UVLO value 170 may be approximately 1.0 V. In some cases, the charging circuitry 150, or a portion thereof, may be disposed within the wireless audio device 130, in which case, the charging circuitry may be powered by the portable charging case 100.

In order to determine if pre-charging is necessary, the charging circuitry 150 may be configured to determine a device battery voltage 160 of the device battery 140 through pre-loading. The charging circuitry 150 may be configured to determine the device battery voltage 160 by first powering on, via a case power source 220 of the portable charging case 100, a device microcontroller 230 of the wireless audio device 130. By powering on the device microcontroller 230, the charging circuitry 150 effectively keeps the wireless audio device 130 active while charging the device battery 140. The case power source 220 may include any combinations of internal and/or external power sources and supplies. In one example, the case power source 220 may include one or more internal batteries. In another example, the case power source 220 may include a power plug connected to an external battery or electric socket via a power cable.

The charging circuitry 150 may be further configured to determine the device battery voltage 160 by applying, via the device microcontroller 230, a pre-charge load 240 to the device battery 140. Essentially, the pre-charge load 240 is an artificial load that is applied to the device battery 140 prior to charging in standard mode to quickly check the device battery voltage 160. The pre-charge load 240 may be equivalent to the load of a wireless audio device. In one example, the charging circuitry 150 may trigger the device microcontroller 230 to activate one or more switching circuits of the wireless audio device 130 to electrically couple one or more of the terminals of the device battery 140 to the pre-charge load 240 of the charging circuitry 150. In one example, the pre-charge load 240 may include one or more resistive elements, such as resistors, arranged in any appropriate series and/or parallel combination. In a further example, the pre-charge load 240 may include additional impedance elements, such as capacitors and/or inductors.

The charging circuitry 150 may be further configured to determine the device battery voltage 160 by retrieving, via the device microcontroller 230, the device battery voltage 160. In one example, the charging circuitry 150 may trigger the device microcontroller 230 to activate one or more switching circuits of the wireless audio device 130 to electrically receive the device battery voltage 160 at one of its inputs.

The charging circuitry 150 may be further configured to determine the device battery voltage 160 by transmitting the device battery voltage 160 from the device microcontroller 230 to a case microcontroller 250 of the portable charging case 100. In one example, the charging circuitry 150 may trigger the device microcontroller 230 to activate one or more switching circuits of the wireless audio device 130 or the portable charging case 100 to facilitate the transmission of the device battery voltage 160 to one of the inputs of the case microcontroller 250.

Once the charging circuitry 150 receives the device battery voltage 160 from the wireless audio device 130, the circuitry 150 may compare the device battery voltage 160 to the UVLO level 170 to determine if the device battery 140 may be charged in standard mode, or if the device battery 140 must first be pre-charged to enable it to be charged in standard mode.

According to an example, the charging circuitry 150 may be further configured to, if the device battery voltage 160 is greater than the UVLO value 170, charge the device battery 140, via the power transfer connection 120, in standard charging mode. The charging circuitry 150 in standard charging mode may be configured to apply a varying standard charging voltage 190 to the device battery 140 to maintain a constant charging current 200. The value of the constant charging current 200 may be dependent on the measured device battery voltage 160, as well as the charging time determined by the charging circuitry 150. For example, in standard mode, the portable charging case 100 may charge device batteries 140 to full charge in either three-hour or six-hour periods. Further, following the determination that the device battery voltage 160 is greater than the UVLO value, and may therefore be charged in standard charging mode, the charging circuitry 150 may be configured to no longer provide power to the device microcontroller 230. Accordingly, in standard charging mode, any power required by the wireless audio device 130 may be provided by the device battery 140.

According to an example, the charging circuitry 150 may be further configured to, if the device battery voltage 160 is less than or equal to the UVLO value 170, charge the device battery 140, via the power transfer connection 120, in pre-charging mode. The charging circuitry 150 in pre-charging mode may be configured to apply a constant pre-charging voltage 210 to the device battery 140. In order to rapidly raise the device battery voltage 160 above the UVLO level, the constant pre-charging voltage 210 may be significantly greater than the standard charging voltage 190. Accordingly, current flow in pre-charging mode will also be significantly greater than the constant charging current 200 of the standard charging mode. In an example, the constant pre-charging voltage 210 may be approximately 2.2 V. Further, in pre-charging mode, the charging circuitry 150 may be configured to continue to provide power to the device microcontroller 230 as done during the pre-loading stage. By continuing to provide power to the device microcontroller 230, the charging circuitry 150 may ensure that pre-charging does not disable the wireless audio device 130 by draining its device battery 140.

Following the pre-charging of the device battery 140, the charging circuitry 150 may continue to charge the device battery 140 by switching to standard charging mode. According to an example, the charging circuitry 150 may be further configured to switch from pre-charging mode to standard charging mode when the device battery voltage 160 is greater than the undervoltage lockout value 170. According to a further example, the charging circuitry 150 may be further configured to switch from pre-charging mode to standard charging mode after charging the device battery 140 in pre-charging mode for a predetermined time interval 180.

Further, if the device battery voltage 160 is very low, pre-charging the device battery 140 at a high voltage may damage the portable charging case 100 and/or the wireless audio device 130. According to an example, the pre-charging mode may be disabled if the device battery voltage 160 is below a minimum charging voltage 260. The minimum charging voltage 260 may be 0.5 V.

Figure 4:
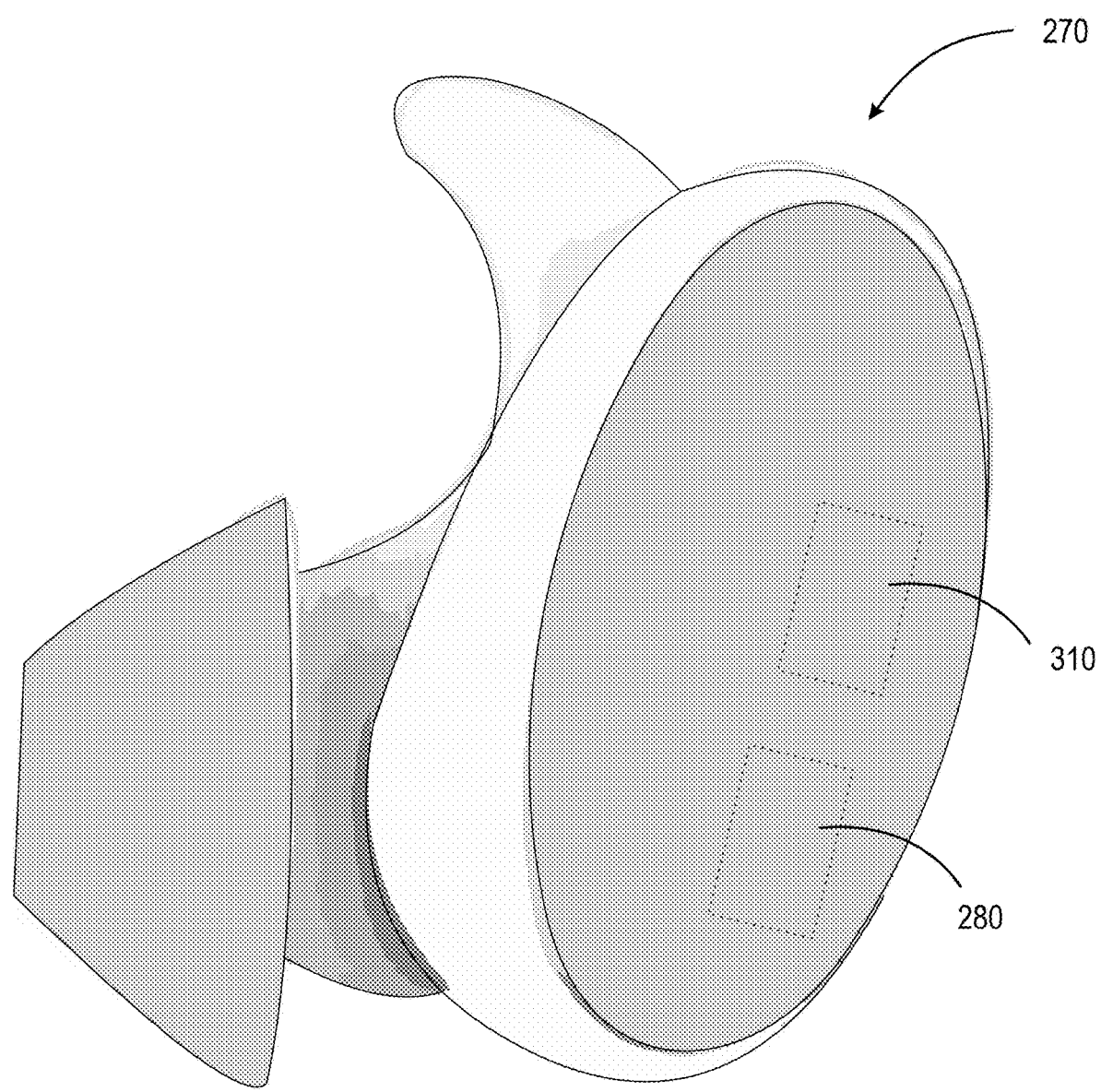
FIG. 4 is an isometric view of a second wireless audio device, according to an example.

In another aspect, and with reference to FIGS. 1 and 2, an audio system 10 may be provided. The audio system 10 may include a first wireless audio device 130, a portable charging case 100, and a second wireless audio device 270. FIG. 3 shows an embodiment of the first wireless audio device 130, and FIG. 4 shows an embodiment of the second wireless audio device 270. The first wireless audio device 130 and the second wireless audio device 270 are intended to be wireless headphones and may wirelessly communicate with an external device, such as a smartphone, the portable charging case 100, and/or each other. The first wireless audio device 130 may be an earbud. The first wireless audio device 130 may include a first device battery 140. The first device battery 140 may be an NiMH battery.

The term "headphone" refers to a device that fits around, on, in, or near an ear and that radiates acoustic energy into or towards the ear canal. Headphones are sometimes referred to as earphones, earpieces, headsets, earbuds or sport headphones, and can be wired or wireless. A headphone includes an acoustic driver to transduce audio signals to acoustic energy. The acoustic driver may be housed in an earcup. While some of the figures and descriptions following may show a single headphone, a headphone may be a single stand-alone unit or one of a pair of headphones (each including a respective acoustic driver and earcup), one for each ear. A headphone may be connected mechanically to another headphone, for example by a headband and/or by leads that conduct audio signals to an acoustic driver in the headphone. A headphone may include components for wirelessly receiving audio signals. A headphone may include components of an active noise reduction (ANR) system. Headphones may also include other functionality such as a microphone so that they can function as a headset. While FIGS. 1, 3, and 4 show examples of in-ear headsets, in other examples the headset may be an around-ear, on-ear, or near-ear headset. In some examples, a headphone may be an open-ear device that includes an acoustic driver to radiate acoustic energy towards the ear canal while leaving the ear open to its environment and surroundings. In some examples, a headphone may be a part of audio enabled glasses.

According to an example, the audio system 10 may further include a portable charging case 100. The portable charging case 100 may include a first charging interface. The first charging interface 110 may be configured to establish a first power transfer connection 120 with the first wireless audio device 130.

According to an example, the portable charging case 100 may further include charging circuitry 150. The charging circuitry 150 may be configured to determine a first device battery voltage 160 of the first device battery 140 using the pre-loading procedure described above. The charging circuitry 150 may be further configured to, if the first device battery voltage 160 is greater than an undervoltage lockout value 170, charge the first device battery 140 via the power transfer connection 120 in standard charging mode. The charging circuitry 150 may be further configured to, if the first device battery voltage 160 is less than or equal to the undervoltage lockout value 170, charge the first device battery 140 via the power transfer connection 120 in pre-charging mode.

According to an example, and with reference to FIG. 4, the audio system 10 may further include a second wireless audio device 270. The second wireless audio device 270 may include a second device battery 280. The portable charging case 100 may further include a second charging interface 290 configured to establish a second power transfer connection 300 with the second wireless audio device 270. In a preferred example, the second wireless audio device 270 may be an earbud of the same model as the first wireless audio device 130. In this example, the first wireless audio device 130 may configured to be inserted into the left ear of the user, while the second wireless audio device 270 may be configured to be inserted into the right ear of the user.

According to an example, the charging circuitry 150 may be further configured to determine a second device battery voltage 290 of the second device battery 280 using the pre-loading procedure described above. Depending on their use, the first and second device battery voltages 160, 290 may be equal or different. For example, if the user has been charging the first wireless audio device 130 while using the second wireless audio device 270, the first device battery voltage 130 may be greater than the second device battery voltage 290.

Figure 5:
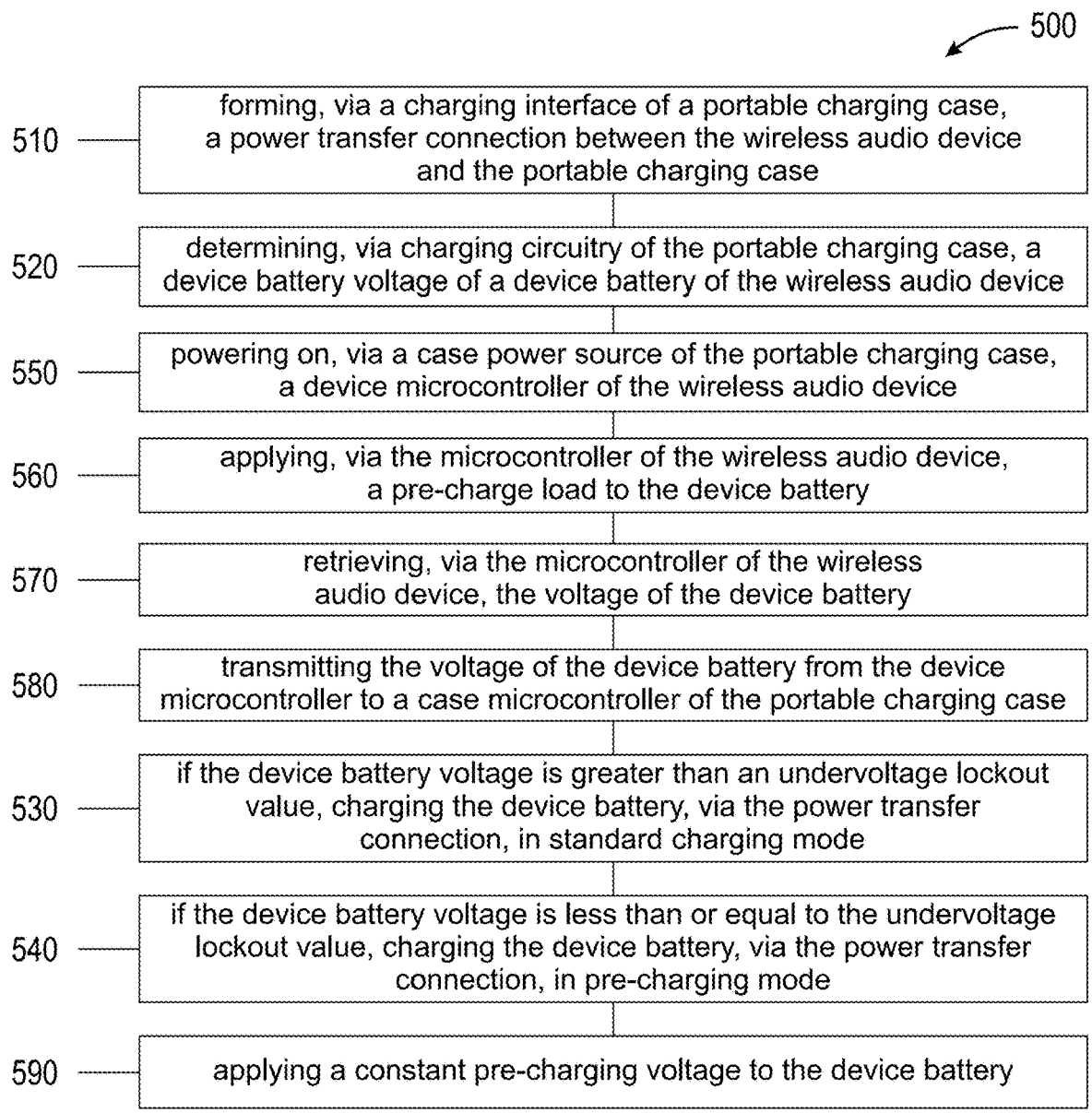
FIG. 5 is a flowchart for a method of charging a wireless audio device, according to an example.

The charging circuitry 150 may be further configured to, if the second device battery voltage 290 is greater than an undervoltage lockout value 170, charge the second device battery 280 via the second power transfer connection 300 in standard charging mode. The charging circuitry 150 may be further configured to, if the second device battery voltage 290 is less than or equal to the undervoltage lockout value 170, charge the second device battery 280 via the second power transfer connection 300 in pre-charging mode. In some examples, the charging circuitry 150 will charge the first device battery 140 in standard charging mode, and while simultaneously charging the second device battery 280 in pre-charging mode, or vice-versa, In another aspect, and with reference to FIG. 5, a method 500 for charging a wireless audio device is provided. The method 500 may include forming 510, via a charging interface of a portable charging case, a power transfer connection between the wireless audio device and the portable charging case. The method 500 may further include determining 520, via charging circuitry of the portable charging case, a device battery voltage of a device battery of the wireless audio device. The method 500 may further include, if the device battery voltage is greater than an undervoltage lockout value, charging 530 the device battery, via the power transfer connection, in standard charging mode. The method 500 may further include, if the device battery voltage is less than or equal to the undervoltage lockout value, charging 540 the device battery, via the power transfer connection, in pre-charging mode.

According to an example, determining 520 a device battery voltage of a device battery of the wireless audio device may include the steps of: (1) powering on 550, via a case power source of the portable charging case, a device microcontroller of the wireless audio device; (2) applying 560, via the microcontroller of the wireless audio device, a pre-charge load to the device battery; (3) retrieving 570, via the microcontroller of the wireless audio device, the voltage of the device battery; and (4) transmitting 580 the voltage of the device battery from the device microcontroller to a case microcontroller of the portable charging case.

According to an example, charging 540 the device battery in pre-charging mode may include the step of applying 590 a constant pre-charging voltage to the device battery.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of"

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A portable charging case, comprising:
   a charging interface configured to establish a power transfer connection with a wireless audio device, wherein the wireless audio device comprises a device battery; and
   charging circuitry configured to:
      determine a device battery voltage of the device battery;
      if the device battery voltage is greater than an undervoltage lockout value, charge the device battery, via the power transfer connection, in standard charging mode by applying a standard charging voltage; and
      if the device battery voltage is less than or equal to the undervoltage lockout value, charge the device battery, via the power transfer connection, in pre-charging mode by applying a pre-charging voltage, wherein the pre-charging voltage is greater than the standard charging voltage.

2. The portable charging case of claim 1, wherein the charging circuitry is further configured to switch from pre-charging mode to standard charging mode when the device battery voltage is greater than the undervoltage lockout value.

3. The portable charging case of claim 1, wherein the charging circuitry is further configured to switch from pre-charging mode to standard charging mode after charging the device battery in pre-charging mode for a predetermined time interval.

4. The portable charging case of claim 1, wherein the charging circuit in standard charging mode is configured to apply a varying standard charging voltage to the device battery to maintain a constant charging current.

5. The portable charging case of claim 1, wherein the charging circuit in pre-charging mode is configured to apply a constant pre-charging voltage to the device battery.

6. The portable charging case of claim 5, wherein the constant pre-charging voltage is approximately 2.2 V.

7. The portable charging case of claim 1, wherein the charging circuit is configured to determine the device battery voltage by:
   powering on, via a case power source of the portable charging case, a device microcontroller of the wireless audio device;
   applying, via the device microcontroller, pre-charge load to the device battery;
   retrieving, via the device microcontroller, the device battery voltage; and
   transmitting the device battery voltage from the device microcontroller to a case microcontroller of the portable charging case.

8. The portable charging case of claim 7, wherein the pre-charge load comprises one or more resistors.

9. The portable charging case of claim 1, wherein the undervoltage lockout value is approximately 1.0 V.

10. The portable charging case of claim 1, wherein the pre-charging mode is disabled if the device battery voltage is below a minimum charging voltage.

11. The portable charging case of claim 10, wherein the minimum charging voltage is 0.5 V.

12. The portable charging case of claim 7, wherein the case power source is a case battery.

13. An audio system, comprising:
    a first wireless audio device comprising a first device battery; and
    a portable charging case comprising:
       a first charging interface configured to establish a first power transfer connection with the first wireless audio device; and
       charging circuitry configured to:
          determine a first device battery voltage of the first device battery;
          if the first device battery voltage is greater than an undervoltage lockout value, charge the first device battery via the first power transfer connection in standard charging mode by applying a standard charging voltage; and
          if the first device battery voltage is less than or equal to the undervoltage lockout value, charge the first device battery via the power transfer connection in pre-charging mode by applying a pre-charging voltage, wherein the pre-charging voltage is greater than the standard charging voltage.

14. The audio system of claim 13, further comprising a second wireless audio device, wherein the second wireless audio device comprises a second device battery, and wherein the portable charging case further comprises a second charging interface configured to establish a second power transfer connection with the second wireless audio device.

15. The audio system of claim 14, wherein the charging circuitry is further configured to:
    determine a second device battery voltage of the second device battery;
    if the second device battery voltage is greater than the undervoltage lockout value, charge the second device battery via the second power transfer connection in standard charging mode; and if the second device battery voltage is less than or equal to the undervoltage lockout value, charge the second device battery via the second power transfer connection in pre-charging mode.

16. The audio system of claim 13, wherein the first wireless audio device is an earbud.

17. The audio system of claim 13, wherein the first device battery is an NiMH battery.

18. A method for charging a wireless audio device, comprising the steps of:
    forming, via a charging interface of a portable charging case, a power transfer connection between the wireless audio device and the portable charging case;
    determining, via charging circuitry of the portable charging case, a device battery voltage of a device battery of the wireless audio device;
    if the device battery voltage is greater than an undervoltage lockout value, charging the device battery, via the power transfer connection, in standard charging mode by applying a standard charging voltage; and
    if the device battery voltage is less than or equal to the undervoltage lockout value, charging the device battery, via the power transfer connection, in pre-charging mode by applying a pre-charging voltage, wherein the pre-charging voltage is greater than the standard charging voltage.

19. The method of claim 18, wherein determining a device battery voltage of a device battery of the wireless audio device comprises the steps of:
    powering on, via a case power source of the portable charging case, a device microcontroller of the wireless audio device;
    applying, via the microcontroller of the wireless audio device, pre-charge load to the device battery;
    retrieving, via the microcontroller of the wireless audio device, the voltage of the device battery; and
    transmitting the voltage of the device battery from the device microcontroller to a case microcontroller of the portable charging case.

20. The method of claim 18, wherein charging the device battery in pre-charging mode comprises the step of applying a constant pre-charging voltage to the device battery.

\* \* \* \* \*